J. F. WILKINSON.
MANUALLY PROPELLED VEHICLE.
APPLICATION FILED JUNE 3, 1921.
1,420,799.
Patented June 27, 1922.
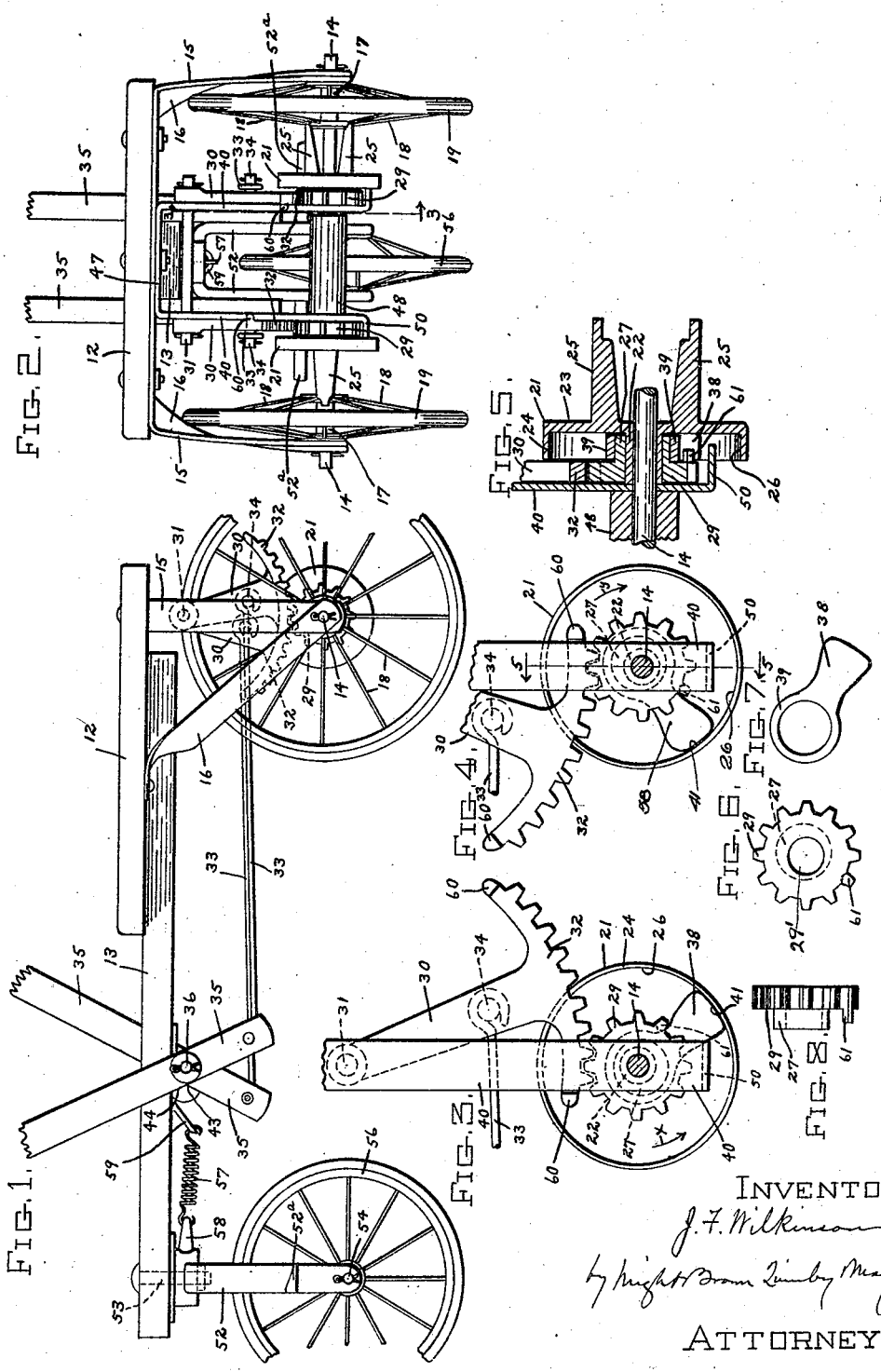
INVENTOR
J. F. Wilkinson
by Knight Brown Quinby May
ATTORNEYS

UNITED STATES PATENT OFFICE.

JOHN F. WILKINSON, OF GARDNER, MASSACHUSETTS.

MANUALLY-PROPELLED VEHICLE.

1,420,799.  Specification of Letters Patent.  Patented June 27, 1922.

Application filed June 3, 1921. Serial No. 474,707.

*To all whom it may concern:*

Be it known that I, JOHN F. WILKINSON, a citizen of the United States, residing at Gardner, in the county of Worcester and State of Massachusetts, have invented new and useful Improvements in Manually-Propelled Vehicles, of which the following is a specification.

This invention relates chiefly to a vehicle comprising an elongated body, which includes a relatively wide seat forming the rear end portion, and a narrower front portion, formed to project between the legs of a rider sitting on the seat, and running gear including a rear axle extending crosswise of the body and confined against swinging movements, a pair of rear wheels widely spaced apart on the rear axle, a steering fork pivotally connected with the forward portion of the body to turn on a substantially vertical axis, a front axle mounted in the fork, and a steering-wheel on the front axle, the fork being adapted to be turned by the rider to steer the vehicle.

The chief object of the invention is to enable a vehicle of this type to be propelled by the hands of the rider, instead of being propelled by the alternate thrust of the rider's feet on a supporting surface.

The invention consists in the improvements which I will now proceed to describe and claim.

Of the accompanying drawings, forming a part of this specification,—

Figure 1 is a side elevation of a vehicle embodying the invention.

Figure 2 is a rear end elevation.

Figure 3 is a fragmentary section on line 3—3 of Figure 2, and an elevation of parts at the right of said line.

Figure 4 is a view similar to Figure 3, showing different positions of the movable parts.

Figure 5 is a section on line 5—5 of Figure 4.

Figure 6 is a side view, showing one of the eccentric hubs hereinafter described, and the gear connected therewith, the hub being shown by dotted lines.

Figure 7 is a side view of one of the dogs.

Figure 8 is an edge view of the hub and gear shown by Figure 6.

This application is a continuation in part of my application filed June 8, 1920, Serial No. 387,390.

The same reference characters indicate the same parts in all of the figures.

The vehicle body is composed of a relatively wide rear end portion 12, forming a seat, and a narrower forward end portion 13, preferably bolted to the seat portion. 14 represents a rear axle, mounted at its ends in sockets or bearings in standards attached to, and projecting downward from the rear end portion of the body, each standard being preferably composed of an upright member 15, and an inclined member 16, the upper ends of said members being bolted to the body. The hubs 17 of the two rear wheels are mounted to rotate loosely on the end portions of the axles 14, each wheel being preferably composed of a hub 17, wire spokes 18, and a rim 19 having a suitable tire. The hubs 17 are located at the inner sides of the standard members 15, and confined by the latter against outward endwise displacement on the axle.

I have provided manually operable driving means for rotating the rear wheels, or either of them, to propel the vehicle, and while it is obviously desirable that each rear wheel be a propelling or driving wheel, I wish it to be understood that one of the two duplicate driving mechanisms hereinafter described, and the wheel driven thereby, may constitute an embodiment of the invention, so far as the manual propulsion of the vehicle is concerned.

Referring to the right hand driving-wheel shown by Figure 7, the mechanism for rotating said wheel is embodied as next described. A driving member, designated as a whole by 21, is mounted to rotate loosely on the axle 14. Said member includes a web 23 (Figure 5), having a central sleeve 22, loosely receiving the axle, an annular flange 24 formed on the web, and means engaging the driving member with the wheel to cause the wheel to rotate with the driving member, said means being preferably embodied in two ears 25, formed on, and projecting from the web 23, and entering spaces between adjacent spokes 18 of the wheel.

The inner surface of the annular flange 24 constitutes an annular clutch face 26, which is concentric with the axle 14.

27 represents an eccentric collar or hub having a bore 29', fitted to turn freely in either direction on the sleeve 22, and a circular periphery, which is eccentric to the bore and axle. Said hub is provided with an element of means, whereby it may be rocked on the sleeve 22, said element being preferably a pinion 29, formed integral with the hub, the periphery of the hub being eccentric to the circular series of pinion teeth. Other elements of said means are an arm 30 pivoted to oscillate on a fixed stud 31, and provided with a segmental rack 32 meshing with the pinion 29, a connecting-rod 33 pivoted on studs 34 on said arm, and a lever 35 fulcrumed on a stud 36 fixed to the body, one arm of the lever projecting below the body and being engaged with the connecting-rod, the other arm projecting above the body and being formed as a handle, whereby the lever may be oscillated.

38 represents an oscillatory dog formed on a ring 39, the circular inner margin of which loosely embraces the eccentric periphery of the hub 27. The outer end of the dog forms a clutch face 41, adapted to engage the annular clutch face 26 of the driving member.

The body is provided with fixed stops, adapted to limit the oscillating movements of the lever 35, and the rocking movements of the eccentric hub 27, said stops being preferably oppositely inclined faces 43 and 44, arranged in the path of the lever 35. When the lever is moved to one extreme of its movement, it abuts against the stop face 43, and when it is moved in a position of opposite inclination, it abuts against the stop face 44.

It will now be seen that the eccentric hub 27 is rocked on the sleeve 22, by oscillating movements of the lever, and that the rocking movements are limited by the described stop means. Figure 3 shows the hub at one extreme of its rocking movement, and Figure 4 shows the hub at the opposite extreme of said movement. When the hub is moved in the direction of the arrow $x$ (Figure 3), it forces the dog 38 slightly outward, so that the clutch face 41 of the dog engages the annular clutch face 26 of the driving member, and rotates the latter and the wheel engaged therewith, in a forward direction. When the hub is moved in the direction of the arrow $y$ (Figure 4), it draws the dog 38 slightly inward, so that the clutch faces are disengaged and the driving member and wheel are free to continue their forward rotation.

The other wheel shown at the left of Figure 2, is driven by a duplicate of the mechanism above described, the arrangement of the levers, eccentric hubs and dogs of the two mechanisms being such that torque is exerted alternately on the wheels to rotate the same in a forward direction, by a backward pull on the upper arms of the levers.

The driving members 21 are held in engagement with the wheels, and the eccentric hubs 27 are confined against endwise displacement on the axle 14 by vertical arms 40, which are connected by a neck 47, bolted to the body, said arms constituting abutments bearing on the inner sides of the gears 29 forming parts of the hubs 27. A tubular strut or spacing member 48 is placed on the axle 14, between the arms or abutments 40. The stud 31 is supported by the arms 40, as shown by Figure 2.

The lower ends of the arms 40 are bent inward to form stop ears 50, located in the paths of the dogs 38, and, as shown by Figure 3, serving to limit the movement of the dogs in one direction. These stops are intended to prevent the dogs from moving backwardly too far, while their clutch faces are disengaged from the annular clutch faces 26.

52 represents a steering fork, adapted to turn on a vertical stud 53, connected with the forward end portion of the body. 54 represents a short axle engaged with the arms of the steering fork. Mounted on the axle 54, between the fork arms, is a steering-wheel 56.

A connection is provided between the upper portion of the fork and the body, said connection including a spring 57, an arm 58 fixed to the upper end of the fork and engaged with one end of the spring, and an arm 59 fixed to the body, and engaged with the opposite end of the spring. This connection normally maintains the front axle 54 parallel with the rear axle 14, so that in case the vehicle is pushed while the steering fork is not controlled by the rider, the vehicle will move in a straight line.

The steering fork 52 is provided with foot rests 52$^a$, on which the feet of the rider may bear to steer the vehicle.

As an additional means for limiting the rocking movements of the eccentric hubs 27, I provide the opposite ends of the racks 32 with stop ears 60, adapted to abut against the arms 40, as indicated by Figures 3 and 4, and thus limit the oscillating movements of the racks.

Means limiting the rocking movements of the eccentric hub to a predetermined arc, prevents the possibility of the difficulty known as a "dead-center" when the mechanism is being operated, it being impossible for the operator to move the eccentric hub far enough in either direction to cause a dead-center.

To prevent the dog 38 from dropping by gravity from the position shown by Figure 4, at the end of the forward rotation of the hub 27 and gear 29, I provide a projection or stop 61 which moves with the hub 27 and is preferably formed on one end of a tooth of the pinion 29, and is arranged to bear on one edge of the dog, as indicated by dotted lines in Figure 4. When the dog is supported or arrested by the projection 61, as shown by Figure 4, the clutch face of the dog is disengaged from the clutch face 26 of the driving member, so that the driving member may continue to rotate in a forward direction after the dog is arrested. The projection causes the dog to move with the hub and pinion when they are rotated backwardly.

The axle 14 is the center or axis of oscillation of the rocking eccentric hub, and, although I prefer to mount the hub directly on the sleeve 22, as shown, it is obvious that any other mounting of the hub so that it will oscillate in a path concentric with the sleeve 22, may be adopted. It is also obvious that the annular clutch face on the driving member, and the clutch face on the dog, may have any suitable form and relative arrangement, causing the dog clutch face to engage the annular clutch face, when the hub is turned in one direction, and to slip loosely when the hub is turned in the opposite direction.

The wheels, the axles, and the means supporting the body from the wheels and axles, constitute elements of the running gear of the vehicle.

I claim:

1. A manually propelled vehicle comprising a body, running gear including an axle supported below the body, and a loose driving-wheel on the axle, and manually operable wheel-driving mechanism including a driving member engaged with the driving wheel to rotate therewith, said driving member being loosely rotatable on the axle, and provided with an annular clutch face concentric with and spaced from the axle, an eccentric hub adapted to rock or oscillate in a path concentric with the axle, and with the annular clutch face, an oscillating dog adapted to swing on said hub, and having a clutch face at its outer end, adapted to engage said annular clutch face, and manually operable means for rocking said hub, the arrangement being such that when the hub is turned in one direction, it causes an operative engagement of said clutch faces, and when the hub is turned in the opposite direction, the clutch faces are disengaged.

2. A manually propelled vehicle comprising a body, running gear including an axle supported below the body, and a loose driving-wheel on the axle, and manually operable wheel-driving mechanism including a driving member engaged with the driving wheel to rotate therewith, said driving member being loosely rotatable on the axle, and provided with an annular clutch face concentric with and spaced from the axle, an eccentric hub mounted to rock or oscillate in a path concentric with the axle, and with the annular clutch face, an oscillating dog adapted to swing on said hub, and having a clutch face at its outer end, adapted to engage said annular clutch face, and manually operable means for rocking said hub, the arrangement being such that when the hub is turned in one direction, it causes an operative engagement of said clutch faces, and when the hub is turned in the opposite direction, the clutch faces are disengaged, means being provided for limiting the rocking movements of the hub to a predetermined arc.

3. A manually propelled vehicle substantially as specified by claim 1, a fixed stop being provided in the path of said dog to limit the swinging movement of the latter in one direction.

4. A manually propelled vehicle substantially as specified by claim 1, the eccentric hub being provided with a stop 61, movable with the hub and arranged to limit the swinging movement of the dog in one direction.

5. A manually propelled vehicle comprising a body, running gear including an axle supported below the body and a loose driving wheel on the axle, and manually operable wheel-driving mechanism, including a driving member engaged with the driving wheel to rotate therewith, and loosely rotatable on the axle, said member being provided with an annular clutch face concentric with, and spaced from the axle, an eccentric hub mounted to rock in a path concentric with the axle, an oscillatory dog adapted to swing on said hub, and having a clutch face at its outer end, adapted to engage said annular clutch face, the eccentric hub being provided with a pinion, an oscillatory arm pivoted to a fixed support and provided with a segmental rack meshing with said pinion, an oscillatory lever fulcrumed on the body, and a rod connecting said lever with the oscillatory arm, said lever, rod, arm, rack and pinion being adapted to rock the hub, the arrangement being such that the rocking movements of the hub alternately engage and separate the clutch faces.

6. A manually propelled vehicle comprising a body, running gear including an axle supported below the body and a loose driving wheel on the axle, and manually operable wheel-driving mechanism, including a driving member engaged with the driving wheel to rotate therewith, and loosely rotatable on the axle, said member being provided with an annular clutch face concentric with, and spaced from the axle, an eccentric hub mounted to rock in a path concentric with the axle, an oscillatory dog adapted to swing on said hub, and having a clutch face at its outer end, adapted to engage said annular clutch face, the eccentric hub being provided with a pinion, an oscillatory arm pivoted to a fixed support and provided with a segmental rack meshing with said pinion, an oscillatory lever fulcrumed on the body, a rod connecting said lever with the oscillatory arm, said lever, rod, arm, rack and pinion being adapted to rock the hub, and stops adapted to limit the oscillating movements of the lever and the rocking movements of the hub, the arrangement being such that the rocking movements of the hub alternately engage and separate the clutch faces.

7. A manually propelled vehicle substantially as specified by claim 1, the body being provided with a fixed abutment confining the driving member in engagement with the wheel, and the hub and dog in operative relation to the driving member.

8. A manually propelled vehicle substantially as specified by claim 1, the body being provided with a fixed abutment confining the driving member in engagement with the wheel, and the hub and dog in operative relation to the driving member, said abutment having a stop located in the path of the dog and limiting the swinging movement of the latter.

9. A manually propelled vehicle substantially as specified by claim 1, the body being provided with a fixed abutment confining the driving member in engagement with the wheel, and the hub and dog in operative relation to the driving member, the driving member being provided with laterally projecting ears confined by said abutment in engagement with the wheel.

10. A manually propelled vehicle comprising a body, running gear including an axle supported below the body, and a loose driving wheel on the axle, and manually operable wheel-driving mechanism, including a driving member engaged with the driving wheel to rotate therewith, and having a sleeve loosely rotatable on the axle, said member having an annular flange provided with an internal clutch face concentric with, and spaced from the sleeve, an eccentric hub mounted to rock on said axle, an oscillatory dog adapted to swing on said hub, and having a clutch face at its outer end, adapted to engage said annular clutch face, and manually operable means for rocking said hub, the arrangement being such that when the hub is turned in one direction, it causes an operative engagement of said clutch faces, and when the hub is turned in the opposite direction, the clutch faces are disengaged, means being provided for limiting the rocking movements of the hub to a predetermined arc.

11. A manually propelled vehicle comprising a body, running gear including an axle supported below the body, a pair of loose-driving wheels on the axle, driving members engaged with the driving wheels to rotate therewith, each driving member being loosely rotatable on the axle, and provided with an annular clutch face concentric with, and spaced from the axle, eccentric hubs mounted to rock in paths concentric with the axle, oscillatory dogs adapted to swing on said hubs, and having clutch faces at their outer ends, adapted to engage said annular clutch faces, oscillatory levers fulcrumed on the body, and connections between said levers and the hub, said levers and connections being adapted to rock the hubs simultaneously in opposite directions, the arrangement being such that the rocking movements of the hubs alternately interengage and separate the said clutch faces.

12. A manually propelled vehicle comprising a body, running gear including an axle supported below the body, a pair of loose driving wheels on the axle, driving members engaged with the driving wheels to rotate therewith, each driving member being loosely rotatable on the axle, and provided with an annular clutch face concentric with, and spaced from the axle, eccentric hubs mounted to rock in paths concentric with the axle, oscillatory dogs adapted to swing on said hubs, and having clutch faces at their outer ends, adapted to engage said annular clutch face, oscillatory levers fulcrumed on the body, connections between said levers and the hubs, said levers and connections being adapted to rock the hubs simultaneously in opposite directions, and stops adapted to limit the oscillating movements of the levers and the rocking movements of the hubs, the arrangement being such that the rocking movements of the hubs alternately interengage and separate the said clutch faces.

13. A manually propelled vehicle comprising a body, running gear including standards fixed to and projecting downward from the body, an axle engaged with said standards, and a pair of loose driving wheels on the axle at the inner sides of the standards, a pair of driving members engaged with the driving wheels to rotate therewith, each driving member being loosely rotatable on the axle, and provided with an annular clutch face concentric with, and spaced from the axle, eccentric hubs mounted to rock in paths concentric with the axle, oscillatory dogs adapted to swing on said hubs, and having clutch faces at their outer ends, adapted to engage said annular clutch faces, oscillatory levers fulcrumed on the body, connections between said levers and the hubs, said levers and connections being adapted to rock the hubs, and fixed abutments secured to the body and axle, confining the driving members in engagement with the wheels, and the hubs and dogs in operative relation to the driving members.

In testimony whereof I have affixed my signature.

JOHN F. WILKINSON.